United States Patent
Lorteije

[11] 3,868,674
[45] Feb. 25, 1975

[54] VISUAL DISPLAY APPARATUS INCLUDING A LIQUID CRYSTAL DISPLAY PANEL

[75] Inventor: Jean Hubertus Josef Lorteije, Emmasingel, Eindhoven, Netherlands

[73] Assignee: U.S. Philips Corporation, New York, N.Y.

[22] Filed: June 20, 1974

[21] Appl. No.: 481,343

Related U.S. Application Data

[63] Continuation of Ser. No. 310,173, Nov. 28, 1972, abandoned.

[30] Foreign Application Priority Data
Dec. 9, 1971 Netherlands.................... 7116844

[52] U.S. Cl........ 340/324 M, 340/336, 350/160 LC
[51] Int. Cl............................ G09f 9/32, G02f 1/18
[58] Field of Search .......... 340/324 R, 324 M, 336, 340/166 EL; 350/160 LC

[56] References Cited
UNITED STATES PATENTS
3,642,348 2/1972 Wysocki et al.............. 350/160 LC
3,653,745 4/1972 Mao............................ 350/160 LC Primary Examiner—John W. Caldwell
Assistant Examiner—Marshall M. Curtis
Attorney, Agent, or Firm—Frank R. Trifari; Gerald H. Kiel

[57] ABSTRACT

Liquid crystal display apparatus using pulse operation in which the panel is maintained by an electronic switch each time after the occurrence of a supply voltage pulse so as to increase the contrast and the response speed thereof.

7 Claims, 3 Drawing Figures

VISUAL DISPLAY APPARATUS INCLUDING A LIQUID CRYSTAL DISPLAY PANEL

This is a continuation, of application Ser. No. 310,173, filed 11-28-72.

The invention relates to visual display apparatus including a liquid crystal display panel which comprises an electrode system fed from a pulse source.

Display apparatus of the kind described above is known from Electronics 6-7-1970, page 69, column 2, lines 5–10. Although a longer lifetime and a limitation of the power output relative to a direct voltage-operated panel are obtained, the contrast thereof is, however, slighter due to the pulse operation.

An object of the invention is to obviate this drawback.

To this end, a visual display apparatus of the kind described in the preamble, according to the invention is characterized in that a pulse-controlled short-circuit arrangement is coupled to the said electrode system for reducing the supply voltage to a value of substantially zero every time after the occurrence of a supply voltage pulse.

It has been found that a quick voltage variation caused by the short-circuit arrangement has an effect of increasing the contrast and the response speed of the display panel.

Figure 1:
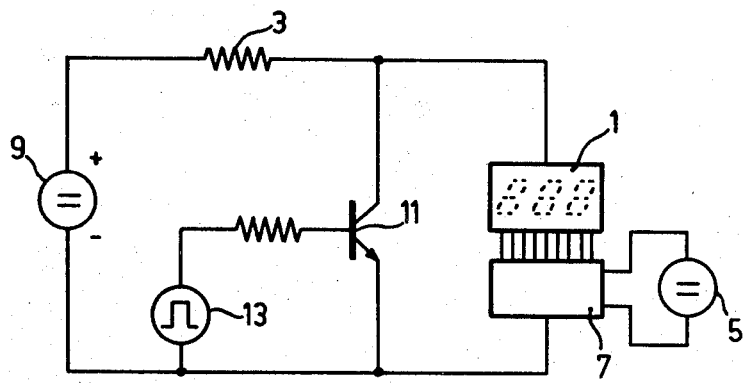
Figure 2:
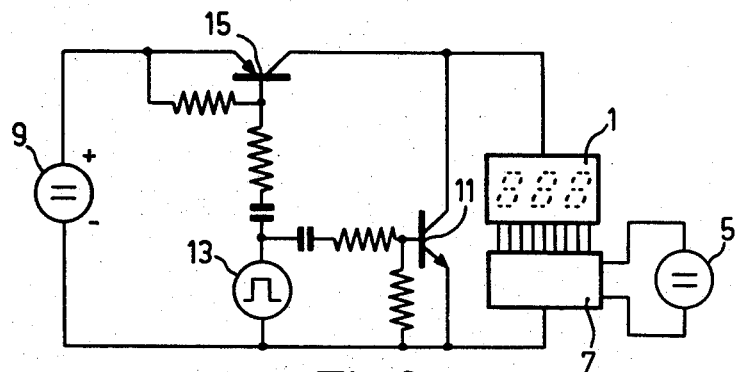
Figure 3:
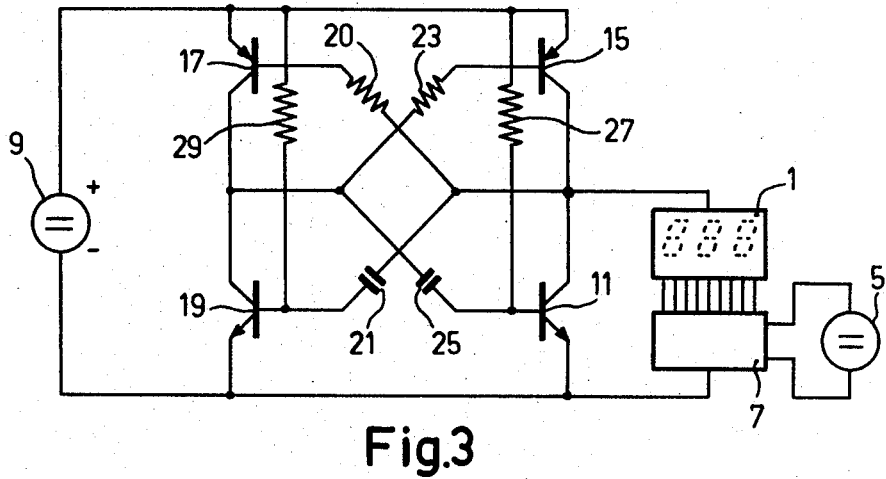

The invention will be described with reference to the following drawing containing a plurality of embodiments:

FIG. 1 is a circuit diagram of visual display apparatus according to the invention, FIG. 2 is a circuit diagram of visual display apparatus according to the invention in which a series and a parallel switch are used, FIG. 3 shows a further elaboration of the circuit according to FIG. 2 in which the series and parallel switches form part of a self-oscillating multivibrator circuit.

In FIG. 1 a liquid crystal display panel 1 is connected to a direct voltage supply 9 at one end through a resistor 3 and at the other end through a logical circuit 7 fed by a supply 5.

The display panel 1 has an electrode system (not shown) electrodes of which can be selected by the logical circuit 7 which electrodes are to be energized so as to obtain a visual display of, for example, characters on the panel.

A short-circuit arrangement in the form of a collector-emitter path of an npn transistor 11 driven on its base by a pulse generator 13 is provided between the junction of panel 1 and resistor 3 and the junction of logical circuit 7 and voltage supply 9.

As a result of the short-circuit arrangement, the voltage across the panel is periodically and rapidly reduced to substantially zero. Due to this step, it is found that a contrast can be obtained as a result of the voltage variations at the panel, which contrast substantially corresponds to that obtained in case of direct voltage supply, while the advantage of a longer lifetime of the panel is maintained. The said effect does not occur, when the voltage changes immediately from positive to negative, or conversely, such as, for example, when applying a square-wave voltage which is as much positive as it is negative.

To limit the energy consumption of the circuit to a minimum the resistor 3 may be replaced by a further transistor 15 of the pnp-type, which is cut off whenever the transistor 11 conducts and conversely, as can be seen in FIG. 2.

A very favorable embodiment of a circuit according to the invention, which causes very little loss of power, is shown in FIG. 3, in which transistors 11 and 15 form part of a self-oscillating multivibrator circuit, which has a series arrangement of a pnp-transistor 17 and an npn-transistor 19 in a parallel branch of the series arrangement with the transistors 11 and 15.

The collectors of transistors 11 and 15 are connected through a resistor 20 to the base of transistor 17, and through a capacitor 21 to the base of transistor 19. The collectors of transistors 17 and 19 are connected through a resistor 23 to the base of transistor 15, and through a capacitor 25 to the base of transistor 11.

The bases of transistors 11 and 19 are furthermore connected through resistors 27 and 29, respectively, to the positive terminal of the supply 9.

The operation of the multivibrator is as follows.

When transistor 19 conducts, the voltage at its collector is low and transistor 15 is maintained conducting through resistor 23. The voltage at its collector is then high, so that transistor 17 is cut off. Transistor 11 is cut off because capacitor 25 is not recharged yet. As soon as this is effected through resistor 27, transistor 17 starts to conduct so that transistor 19 is cut off. Transistor 17 is rendered conducting and transistor 15 is cut off until capacitor 21 is recharged through resistor 29.

When transistor 11 conducts and there is consequently no voltage across the panel 1, the supply 9 provides substantially only the current through resistor 20 as a loss current for the base-emitter junction of transistor 11, as well as the recharge current for capacitor 21. Both currents can be maintained small by a correct choice of the values of the components.

In the other condition of the a current flows in a corresponding manner through resistors 23 and 27. Panel 1 then receives current in that condition through the then conducting transistor 15. Resistors 23 and 27 in which losses occur are also proportioned in such manner that these losses are as small as possible.

It will be evident that the short-circuit switch 11, will in practice exhibit some resistance, or that a resistor can be arranged in series therewith, if desired, without this being considered to be beyond the protective scope of the claims.

To extend the lifetime of the panel to a further extent, while maintaining the obtained increase of contrast; the panel may be fed by positive pulses alternated by negative ones; the supply voltage must then be maintained at zero for some time between two successive pulses with the aid of a short-circuit arrangement so as to obtain the desired improvement in efficiency.

What is claimed is:
1. Visual display apparatus comprising:
   A. a liquid crystal display panel;
   B. direct voltage supply means comprising first and second terminals;
   C. controllable semiconductor impedance means connected to form a parallel circuit with said display panel;
   D. a pulse voltage source connected to said semiconductor means to cause said semiconductor means to be alternately conductive and nonconductive; and

E. means for rapidly reducing said pulse voltage to substantially zero by short circuiting said direct voltage supply means comprising an impedance connected in series with said source of direct voltage and said parallel circuit whereby the voltage across means for controlling said display is reduced substantially to zero when said semiconductor means is conductive.

2. The visual display apparatus of claim 1, wherein said semiconductor means comprises a transistor having a base, an emitter, and a collector, said base being connected to said pulse source, and said emitter and collector of the transistor being connected in parallel with said display and in series with said direct voltage supply means.

3. The visual display apparatus of claim 2, wherein said impedance comprises a second transistor of opposite conductivity type with respect to said first-named transistor and having a base, an emitter, and a collector, the base of the second transistor being connected to said pulse source, the emitter-collector circuit of said second transistor being connected in series with said voltage supply means and the emitter-collector circuit of said first transistor.

4. The visual display apparatus of claim 3 in which said pulse source comprises:
A. a third transistor having a base, an emitter and a collector;
B. a collector load in series with the emitter-collector circuit of said third transistor; and
C. positive feedback circuit means connected between said third transistor and said first-named transistor to produce voltage pulses at said base of said first-named transistor.

5. The visual display apparatus of claim 1 in which said display panel comprises a plurality of indicia segments and said apparatus comprises, in addition, a logic circuit connected in series with said display panel to control connection of selected ones of said segments in said parallel circuit.

6. The visual display apparatus of claim 4 in which said collector load comprises a fourth transistor having a base, an emitter and a collector, the emitter-collector circuit of said fourth transistor being connected in series with said emitter-collector circuit of said third transistor.

7. The visual display apparatus of claim 6 in which said third transistor is of the same conductivity type as said first-named transistor and said fourth transistor is of the same conductivity type as said second transistor, and said feedback circuit means comprises:
A. a first capacitor connected in series between the collector of said first-named transistor to the base of said third transistor;
B. a second capacitor connected in series between the collector of said third transistor to the base of said first-named transistor;
C. a first resistor connected in series between the base of said fourth transistor and the collector of said first-named transistor; and
D. a second resistor connected in series between the base of said second transistor and the collector of said third transistor, whereby said first-named and said fourth transistors are conductive simultaneously and said second and third transistors are conductive simultaneously.

* * * * *

PO-1050
(5/69)

UNITED STATES PATENT OFFICE
CERTIFICATE OF CORRECTION

Patent No. 3,868,674           Dated May 30, 1975

Inventor(s) Jean Hubertus Josef Lorteije

It is certified that error appears in the above-identified patent and that said Letters Patent are hereby corrected as shown below:

In the Foreign Application Priority Data, change the number from "7116844" to --7116944--.

Signed and Sealed this twenty-ninth Day of July 1975

[SEAL]

Attest:

RUTH C. MASON
*Attesting Officer*

C. MARSHALL DANN
*Commissioner of Patents and Trademarks*